United States Patent
Lee et al.

(10) Patent No.: US 9,595,744 B2
(45) Date of Patent: Mar. 14, 2017

(54) CLOSED-LOOP COOLING DEVICE FOR BATTERIES

(71) Applicant: SK Innovation Co., Ltd., Seoul (KR)

(72) Inventors: Won Jun Lee, Daejeon (KR); Hyuk Chan Tae, Daegu (KR); Ji Seok Lee, Chungcheongnam-do (KR)

(73) Assignee: SK Innovation Co., Ltd., Seoul (KR)

( * ) Notice: Subject to any disclaimer, the term of this patent is extended or adjusted under 35 U.S.C. 154(b) by 328 days.

(21) Appl. No.: 14/362,893

(22) PCT Filed: Nov. 28, 2012

(86) PCT No.: PCT/KR2012/010178
§ 371 (c)(1),
(2) Date: Jun. 4, 2014

(87) PCT Pub. No.: WO2014/084415
PCT Pub. Date: Jun. 5, 2014

(65) Prior Publication Data
US 2014/0342210 A1 Nov. 20, 2014

(51) Int. Cl.
*H01M 2/10* (2006.01)
*H01M 10/625* (2014.01)
(Continued)

(52) U.S. Cl.
CPC ..... *H01M 10/5004* (2013.01); *H01M 2/1072* (2013.01); *H01M 10/613* (2015.04);
(Continued)

(58) Field of Classification Search
CPC ............. H01M 10/613; H01M 10/525; H01M 10/647; H01M 10/6556; H01M 10/6561;
(Continued)

(56) References Cited

U.S. PATENT DOCUMENTS

| | | | |
|---|---|---|---|
| 9,118,092 B2 | 8/2015 | Tsychkov et al. | |
| 2007/0196728 A1* | 8/2007 | Yang | B60L 11/1874 429/120 |

(Continued)

FOREIGN PATENT DOCUMENTS

| | | |
|---|---|---|
| CN | 102666157 A | 9/2012 |
| JP | 11135160 A | 5/1999 |

(Continued)

*Primary Examiner* — Eugenia Wang
(74) *Attorney, Agent, or Firm* — The Webb Law Firm

(57) ABSTRACT

Provided is a closed-loop cooling device for batteries, including: a housing including components of the cooling device for batteries disposed therein and sealed to prevent outer air from being introduced thereinto; a battery module disposed inside the housing; an inlet duct including an intake port through which cooled gas is introduced into the battery module; a blower fan including an exhaust port through which gas present inside the battery module is discharged and sucking and discharging the gas; a loop duct having one side connected to the exhaust port and the other side connected to the intake port to deliver the gas; a heat exchanger connected to the loop duct to cool heated gas; and a pipe through which a cooling fluid to cool the heat exchanger moves.

2 Claims, 1 Drawing Sheet

(51) Int. Cl.
*H01M 10/6556* (2014.01)
*H01M 10/6565* (2014.01)
*H01M 10/647* (2014.01)
*H01M 10/613* (2014.01)

(52) U.S. Cl.
CPC ....... *H01M 10/625* (2015.04); *H01M 10/647* (2015.04); *H01M 10/6556* (2015.04); *H01M 10/6565* (2015.04)

(58) Field of Classification Search
CPC . H01M 10/6563; H01M 10/625; H01M 2/072
See application file for complete search history.

(56) References Cited

U.S. PATENT DOCUMENTS

| | | | | |
|---|---|---|---|---|
| 2009/0233158 A1* | 9/2009 | Kimura | ................ | H01G 9/0003 429/62 |
| 2010/0134940 A1* | 6/2010 | Nguyen | .................. | H01G 2/08 361/91.1 |

FOREIGN PATENT DOCUMENTS

| | | | |
|---|---|---|---|
| JP | 201165805 | A | 3/2011 |
| KR | 1020100062576 | A | 6/2010 |
| KR | 1020110003912 | A | 1/2011 |
| KR | 101054764 | B1 | 8/2011 |
| KR | 1020120122000 | A | 11/2012 |

\* cited by examiner

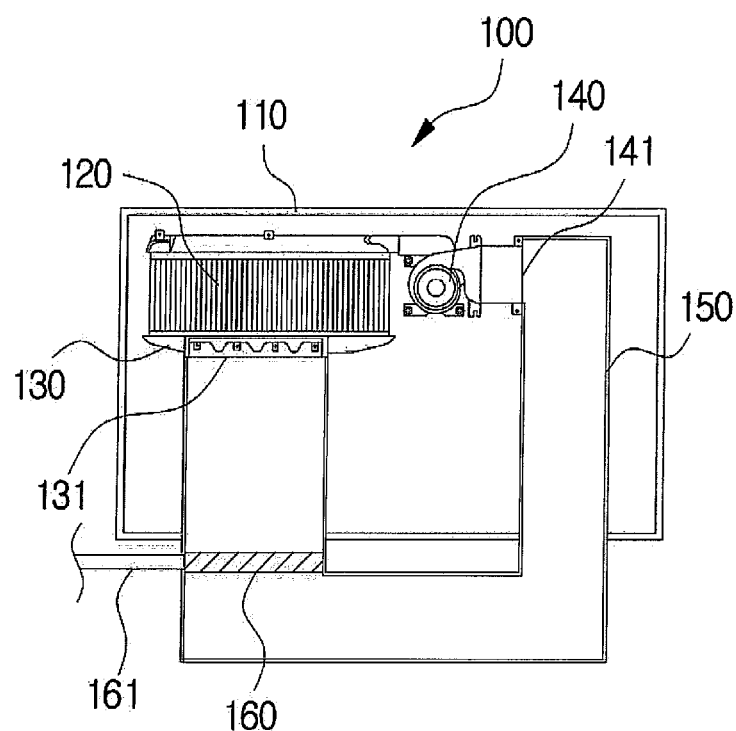

CLOSED-LOOP COOLING DEVICE FOR BATTERIES

CROSS-REFERENCE TO RELATED APPLICATION

This application is the United States national phase of International Application No. PCT/KR2012/010178 filed Nov. 28, 2012, the disclosure of which is hereby incorporated in its entirety by reference.

TECHNICAL FIELD

The present invention relates to a closed-loop cooling device for batteries, and more particularly, to a cooling device for batteries capable of improving stability by preventing outer air from flowing into a closed type case.

BACKGROUND ART

Generally, unlike a primary battery which may not be charged, a secondary battery is a battery which may be charged and discharged. The secondary battery may be used in small portable electronic devices such as a phone, a notebook computer, and a camcorder in the case of a low-capacity battery in which one battery cell is packaged in a pack form and may be configured in large capacity by connecting tens of battery cells in series or in parallel in the case of a power supply for driving a motor of devices requiring high power such as an electric vehicle.

The secondary battery may be manufactured in various types and as a representative type thereof, there may be a pouch type, a cylindrical type, and a prismatic type. In the case of the pouch type, the shape of the secondary battery is relatively free and is light in a weight and has been recently mainly used in slim and lightweight portable electronic devices.

Unlike the circular or prismatic secondary battery in which the case is molded in a thick metal material, in the case of the pouch type secondary battery, the case may be freely bent by attaching a thin metal film and an insulating film to both surfaces thereof and an inside thereof is provided with a space part in which an electrode group may be accommodated.

In a battery of a hybrid vehicle to which the pouch type secondary battery is applied, cells having a thin plate-like structure are made in one module and a package is configured by connecting a plurality of modules in series according to a specification of a hybrid vehicle.

By the package configured by connecting the plurality of modules in series, heat is generated from the cells at the time of charging and discharging and charging and discharging power of the battery is changed depending on temperature of the cells.

Therefore, the temperature of the cell needs to be kept in an appropriate range so that the battery is operated at internal temperature of the battery of, for example, 25 to 40°.

The battery cooling structure according to the related art has a battery case which includes an inner case in which a battery pack is compactly received, an installation part in which a control part controlling the battery of the battery pack is installed, an outer case housing the inner case, and a cooling fan installed in the outer case to cool the battery pack received the inner case.

The battery cooling structure according to the related art uses the cooling fan so as to cool the battery pack positioned inside the outer case using outer air, such that moisture included in the outer air may be introduced into the battery pack, thereby causing an electrical short due to the moisture introduced into the battery pack.

Further, there is a problem in that the battery pack may not be kept at a constant temperature using the outer air.

Further, there is a problem in that harmful gas such as ignition of the cell in the battery pack may be leaked to an outside of the outer case in time of emergency.

A background art of the present invention is disclosed in Korean Patent Laid-Open Publication No. 10-2011-0003912 (Jan. 13, 2011).

DISCLOSURE

Technical Problem

An object of the present invention is to provide a closed-loop cooling device for batteries capable of preventing an electrical short phenomenon of a battery module, keeping temperature of a battery module, and preventing harmful gas generated from the battery module from being leaked to the outside.

Technical Solution

In one general aspect, a closed-loop cooling device for batteries includes: a housing including components of the cooling device for batteries disposed therein and sealed to prevent outer air from being introduced thereinto; a battery module disposed inside the housing; an inlet duct including an intake port through which cooled gas is introduced into the battery module; a blower fan including an exhaust port through which gas present inside the battery module is discharged and sucking and discharging the gas; a loop duct having one side connected to the exhaust port and the other side connected to the intake port to deliver the gas; a heat exchanger connected to the loop duct to cool heated gas; and a pipe through which a cooling fluid to cool the heat exchanger moves.

The loop duct may be manufactured in a form in which a portion thereof protrudes to an outside of the housing and the protruding portion of the loop duct to the outside may be provided with the heat exchanger.

The protruding portion of the loop duct to the outside from the housing may be sealed.

Gas circulating in the loop duct and the battery module may be non-flammable gas.

Advantageous Effects

According to the closed-loop cooling device for batteries in accordance with the exemplary embodiments of the present invention, the outer air may not be introduced into the housing and thus the moisture may be prevented from being introduced into the battery module to prevent the electrical short phenomenon and the temperature of the cooling gas may be controlled using the heat exchanger to keep the temperature of the battery module and prevent the harmful gas generated from the battery module from being leaked to the outside.

DESCRIPTION OF DRAWINGS

The above and other objects, features and advantages of the present invention will become apparent from the following description of preferred embodiments given in conjunction with the accompanying drawings, in which:

FIG. 1 is a schematic diagram of a cooling device for batteries according to an exemplary embodiment of the present invention.

[Detailed Description of Main Elements]

| | |
|---|---|
| 100: Cooling device for batteries | |
| 110: Housing | 120: Battery module |
| 130: Inlet duct | 131: Intake port |
| 140: Blower fan | 141: Exhaust port |
| 150: Loop duct | 160: Heat exchanger |
| 161: Pipe | |

BEST MODE

Hereinafter, a technical spirit of the present invention will be described in more detail with reference to the accompanying drawings. However, the accompanying drawings are only examples shown in order to describe the technical idea of the present invention in more detail. Therefore, the technical idea of the present invention is not limited to shapes of the accompanying drawings.

A closed-loop cooling device 100 for batteries according to an exemplary embodiment of the present invention will be described in detail with reference to FIG. 1.

The closed-loop cooling device 100 for batteries according to the exemplary embodiment of the present invention largely includes a housing 110, a battery module 120, an inlet duct 130, a blower fan 140, a loop duct 150, and a heat exchanger 160.

The housing 110 includes components of the cooling device 100 for batteries and is sealed to prevent the introduction of outer air.

The battery module 120 is positioned inside the housing 110.

The inlet duct 130 is installed in the battery module 120 and is provided with an intake port 131 into which cooled gas is introduced.

In this case, the cooled gas is introduced into the intake port 131 to cool the battery module 120.

The blower fan 140 serves to suck gas present inside the battery module 120 and discharge the sucked gas to the outside and the blower fan 140 is provided with an exhaust port 141 through which gas is discharged to the outside.

That is, the blower fan 140 absorbs heat generated from the battery module 120 and discharges relatively high-temperature gas to the outside through the exhaust port 141.

One side of the loop duct 150 is connected to the exhaust port 141 and the other side thereof is connected to the intake port 131, such that gas from the exhaust port 141 may be discharged to the intake port 131.

The heat exchanger 160 serves as a passage which is connected to the loop duct 150 to cool the heated gas from the exhaust port 141 and discharge the cooled gas to the intake port 131.

Further, the heat exchanger 160 is an apparatus cooling the high-temperature gas to low-temperature gas and is a generally widely used apparatus as an apparatus receiving a cooling fluid to cool air like a generally used radiator, and therefore the detailed description thereof will be omitted.

In this case, the heat exchanger 160 is positioned near the intake port 131 and may directly deliver the cooled gas to the intake port 131 without heat loss.

The loop duct 150 according to the exemplary embodiment of the present invention is manufactured in a form in which a portion thereof protrudes to the outside of the housing 110 and an inside of the protruding portion of the loop duct 150 to the outside is provided with the heat exchanger 160.

Further, the heat exchanger 160 is connected to a pipe 161 to receive the cooling fluid so as to cool gas.

In this case, when the pipe 161 is connected to the heat exchanger 160, the pipe 161 penetrates through the loop duct 150 and therefore the penetrating portion may be sealed to prevent the outer air from being introduced into the loop duct 150.

Further, the protruding portion of the loop duct 150 to the outside may be sealed so as to prevent the outer air from being introduced into the housing 110.

In this case, the heat exchanger 160 is positioned at the protruding portion to the outside of the loop duct 150 and thus moisture which may be generated due to the low temperature of the heat exchanger 160 is not formed inside the housing 110 but is formed outside the housing 110, thereby preventing the components of the present invention from corroding due to the moisture formed inside the housing.

Further, as the gas circulating in the loop duct 150 and the battery module 120, non-flammable gas like nitrogen is used and thus when spark is generated in the battery module 120, it is possible to prevent fire or explosion from occurring.

According to the closed-loop cooling device 100 for batteries in accordance with the exemplary embodiments of the present invention, the outer air may not be introduced into the housing 110 and thus the moisture may be prevented from being introduced into the battery module 120 to prevent the electrical short phenomenon and the temperature of the cooling gas may be controlled using the heat exchanger 160 to keep the temperature of the battery module 120 and prevent the harmful gas generated from the battery module 120 from being leaked to the outside.

The invention claimed is:

1. A closed-loop cooling device for batteries, comprising:
a battery module;
a blower fan sucking gas present inside the battery module and discharging the gas through an exhaust port;
a loop duct connected to the exhaust port at one end thereof and an intake port at another end thereof so as to deliver the gas discharged through the exhaust port;
an inlet duct including the intake port and connected to the battery module to introduce the gas into the battery module;
a housing covering the battery module, the exhaust port, the blower fan, the intake port, and the inlet duct, and a portion of the loop duct and sealed to prevent outer air from being introduced thereinto;
a heat exchanger disposed in the loop duct to cool the gas; and
a pipe connected to the heat exchanger and through which a cooling fluid flows to cool the heat exchanger,
wherein the loop duct has an inner portion which is disposed in the housing and a protruding portion which is protruded outside the housing, the heat exchanger is disposed in the protruding portion of the loop duct to form moisture generated due to the heat exchanger outside the housing, a boundary between the housing and the protruding portion of the loop duct is sealed.

2. The closed-loop cooling device for batteries of claim 1, wherein the gas circulating in the loop duct and the battery module is non-flammable gas.

* * * * *